United States Patent
Rumpf

(10) Patent No.: US 8,103,248 B2
(45) Date of Patent: Jan. 24, 2012

(54) METHOD AND ARRANGEMENT FOR OPERATING MOBILE COMMUNICATION TERMINALS

(75) Inventor: Christoph Rumpf, Gräfelfing (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 327 days.

(21) Appl. No.: 12/309,561

(22) PCT Filed: Jul. 25, 2006

(86) PCT No.: PCT/DE2006/001280
§ 371 (c)(1),
(2), (4) Date: Jan. 22, 2009

(87) PCT Pub. No.: WO2008/011841
PCT Pub. Date: Jan. 31, 2008

(65) Prior Publication Data
US 2009/0247126 A1    Oct. 1, 2009

(51) Int. Cl.
*H04M 3/16* (2006.01)
(52) U.S. Cl. ......... 455/411; 455/418; 455/440; 370/328
(58) Field of Classification Search .................. 455/418, 455/411, 440; 370/328
See application file for complete search history.

(56) References Cited

U.S. PATENT DOCUMENTS

| | | | | |
|---|---|---|---|---|
| 5,163,158 A | * | 11/1992 | Tendler et al. | 455/11.1 |
| 6,826,401 B1 | * | 11/2004 | Morvan et al. | 455/435.1 |
| 7,112,766 B2 | * | 9/2006 | Lerner | 219/445.1 |
| 7,733,224 B2 | * | 6/2010 | Tran | 340/540 |
| 2002/0094805 A1 | | 7/2002 | Yano et al. | |
| 2003/0008662 A1 | | 1/2003 | Stern et al. | |
| 2003/0069033 A1 | * | 4/2003 | Edge et al. | 455/502 |
| 2007/0171855 A1 | * | 7/2007 | Yoneta | 370/328 |

FOREIGN PATENT DOCUMENTS

| | | |
|---|---|---|
| CN | 1276955 A | 12/2000 |
| CN | 1779481 A | 5/2006 |
| DE | 10100825 A1 | 7/2002 |
| EP | 1406466 A2 | 4/2004 |
| EP | 1617686 A1 | 1/2006 |
| EP | 1657951 A1 | 5/2006 |

* cited by examiner

*Primary Examiner* — Danh Le

(57) ABSTRACT

A method and arrangement for operating mobile communication terminals in a radio network with at least one base station, providing a first radio coverage area, and at least one mobile communication terminal in which at least one locally limited area of activity within the first radio coverage area is communicated to the radio network are provided. The mobile communication terminal's entry into the area of activity is detected. In addition, when entry has been detected, a first message from the radio network prompts the mobile communication terminal to transmit ascertained position finding information using a second message and the radio network initiates detection of the second message with the position-finding information. In addition, in the absence of the second message, the mobile communication terminal is manipulated by the base station such that at least some of the communication links are suppressed within the area of activity, with receipt of the second message in the communication terminal at least partially allowing communication links within the area of activity on the basis of identity information identifying the user of the communication terminal.

11 Claims, 1 Drawing Sheet

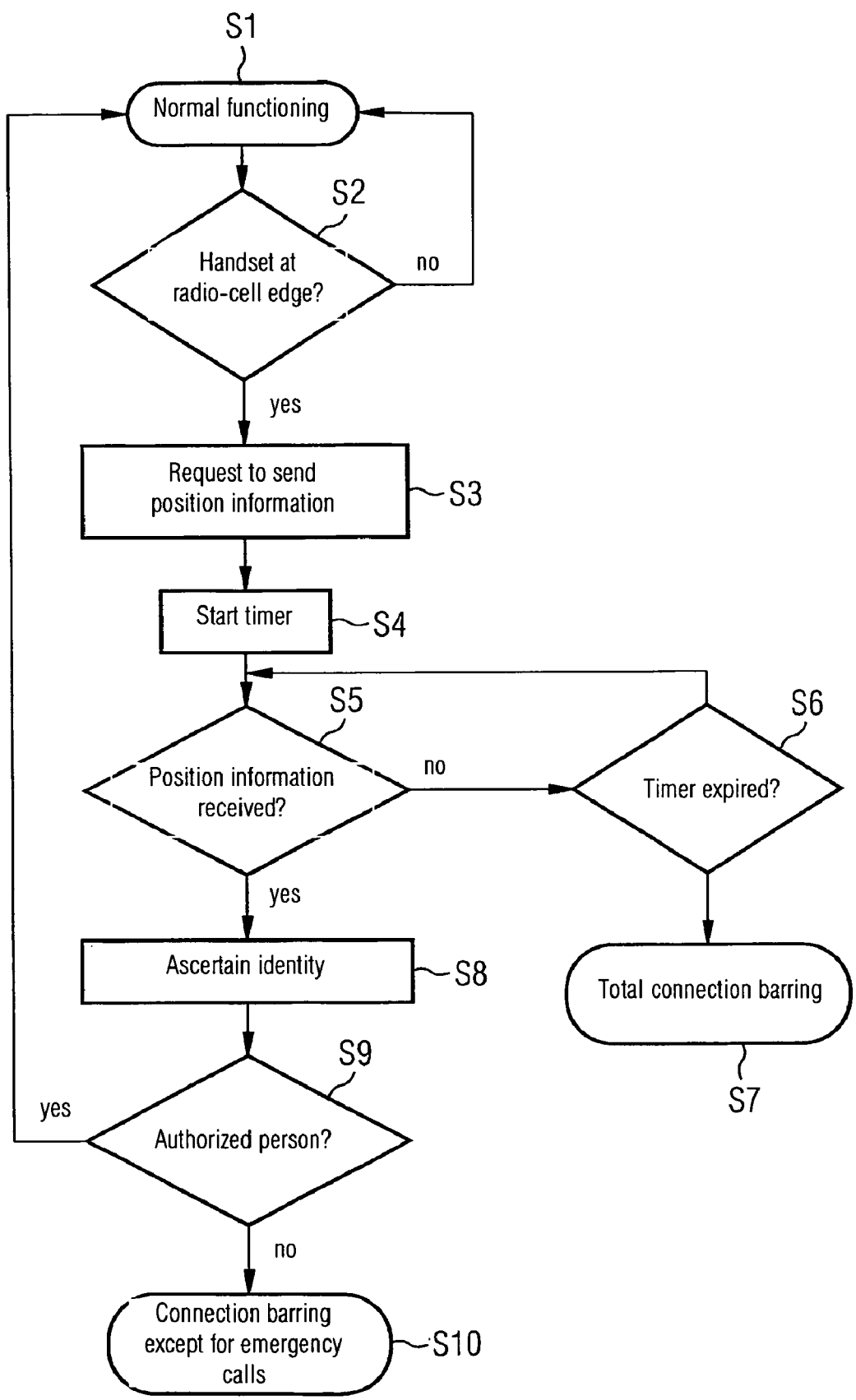

METHOD AND ARRANGEMENT FOR OPERATING MOBILE COMMUNICATION TERMINALS

CROSS REFERENCE TO RELATED APPLICATIONS

This application is the US National Stage of International Application No. PCT/EP2006/001280, filed Jul. 25, 2006 and claims the benefit thereof and which is incorporated by reference herein in its entirety.

FIELD OF INVENTION

The invention relates to a method for operating mobile communication terminals and to an arrangement for operating mobile communication terminals according to the independent claims.

BACKGROUND OF INVENTION

Mobile-radio technology today makes it possible at least in densely populated areas to telephone virtually anywhere without exception. While offering the advantage of being reachable anywhere, that also poses the problem of possibly disturbing others nearby or of conducting undesired communication in places such as public facilities, for instance, in particular schools, churches, and theaters, but also in prisons.

It is in that connection known, for example, that the use of jamming stations intended to prevent undesired mobile-radio traffic is to be allowed on the premises of penal institutions.

Said kind of approach is not, though, technically readily implementable or sufficiently well developed.

An alternative solution for disrupting communication in a simple manner is known from DE 10 100 825 A1, which discloses a method for operating mobile communication terminals whereby profiles are set automatically on mobile communication terminals within a limited range of action, with said range being defined by a control device that is specially provided therefor and performs the setting.

SUMMARY OF INVENTION

However, the cited solutions both have the disadvantage, among others, of being realizable only at great expense and through changing over existing mobile-radio networks.

The object underlying the invention is to disclose a method as well as an arrangement for operating mobile communication terminals that are an improvement with regard to the above.

Said object is achieved by the independent claims.

In the case of the inventive method for operating mobile communication terminals in a radio network having at least one base station providing a first radio-coverage area and having at least one mobile communication terminal, with which method at least one locally limited range of action within the first radio-coverage area is made known to the radio network, said mobile communication terminal's entry at least into a near field of the range of action is registered by detection, with said field referring to a region that is in the transitional zone leading into the range of action. When its entry has been registered, the mobile communication terminal is furthermore prompted by a first message from the radio network to transmit ascertained position-determining information by means of a second message and detection of the second message containing the position-determining information is initiated by the radio network. The mobile communication terminal will in the absence of the second message furthermore be manipulated by the base station such that at least some of the communication links will be prevented within the range of action, with receipt of the second message allowing the communication terminal communication links at least partially within the range of action as a function of identity information identifying the user of the communication terminal.

One advantage of the inventive method among others is the ease with which it can be implemented in existing mobile-radio communication networks. That is due to the fact on the one hand that only already existing base stations are used and, on the other, that it also ensures downward compatibility to the effect that even mobile communication terminals not able to use the inventively implemented prompts or react thereto will nonetheless be put as required into a condition that is desired within the locally limited range of action. The method therein makes it possible through detection in the near field for suitable steps to be performed already in advance of complete entry. An additional degree of freedom is offered by the method in that detection is realized even after entry has occurred.

Therein advantageous is ascertaining the position-determining information based on the determining of coordinates by means of satellites, in particular a determining of coordinates according to the Global Positioning System GPS. That is because, firstly, mobile communication terminals designed for operation within a system of said kind are now in widespread use, which is set to increase owing also to the growing use of mobile communication terminals as navigation systems so that broad support for the inventive method is guaranteed, and, secondly, said type of coordinate determining is globally available and highly accurate.

An alternative or supplementary development is to ascertain the position-determining information based on a determining of coordinates according to the triangulation principle. By that someone skilled in the relevant art understands a measurement that is performed proceeding from three points and allows the measurement's starting point, in this case the mobile communication terminal, to be estimated by determining the point of intersection. An advantage of that approach is its economical and simple practicability, due to the fact that it does not require expanding the mobile communication terminal and that the already present base stations, for example, can be used as triangulation points. Not least because said position determining is possible virtually anywhere using any mobile terminals, it constitutes an advantageous supplement in the sense of a fall-back position for other position-determining methods.

The position-determining information can alternatively or in a supplementary manner also be ascertained based on a determining of coordinates through localizing what is termed a Radio-Frequency Identification—RFID—tag. One of the advantages of that development is that very small ranges of action can be defined owing to the limited range of the radio signals of a tag of said type, and also the position can be determined very accurately. Said RFID tags can furthermore be put to additional use extending beyond their actually intended purpose, namely automatically transmitting data upon entry into a radio-transmitting/radio-receiving area of a corresponding reading device, termed the RFID reader.

The tracking of handsets that is inherent in mobile-radio systems is exploited in a simple way thanks to the advantageous development of registering entry by detecting the mobile communication terminal in radio-coverage areas that border the first radio-coverage area and/or overlap it, thereby enabling the inventive method to be realized with little expenditure.

Alternatively, but to advantage especially in a supplementary way, entry is registered by detecting the mobile communication terminal in the first radio-coverage area. That will enable advantageous handling of, for example, the specific case in which the mobile communication terminal already located within the range of action will be switched on, which would not allow detection in adjacent radio-coverage areas and hence result in an undesired status. That can be applied advantageously both when the radius of the range of action is the same as the radius of the first radio-coverage area and also if the range of action constitutes only a subset of the first radio-coverage area and detection by registering the approaching of overlapping or border regions of the radio-coverage areas cannot allow entry into the range of action to be inferred automatically.

If entry is registered by detecting an RFID tag located in the mobile communication terminal's near field, ranges of action can be realized that are smaller than the first radio-coverage area provided by the relevant base station, which is done, for example, simply by installing RFID readers at each of corresponding entry points in order to ascertain entry into the range of action or exiting the range of action by detecting the corresponding tag motion.

Permission based on the identification information is in an advantageous development granted such that said information is compared with information available to the radio network about persons authorized to conduct the above-cited communication within the range of action and, if the person concerned is registered as being authorized, unrestricted communication will be permitted by the radio network. The advantage of that approach is that the subscriber data available to the respective radio network when the mobile communication terminal enters the radio-coverage area only has to be compared with correspondingly stored data to be able to initiate the inventively desired status changes.

Turning the inventive method to practical account can be handled far more flexibly if permission is granted based on the identification information such that a person authorized to conduct unrestricted communication is determined by means of an RFID tag located in a near field of the mobile communication terminal, because the persons who are authorized will simply be given a chip card provided with the relevant tag so that authorized persons can be distinguished from unauthorized persons. A modification on the part of the radio network for implementing the method will furthermore be minimized thereby.

The absence of the second message is advantageously determined by the expiration of a time interval pre-specified for sending the first message.

The arrangement that executes the inventive method for operating mobile communication terminals advantageously enables the desired status change in locally limited ranges of action.

The object is further achieved by means of the inventive arrangement that advantageously offers the above-cited advantages owing to means for implementing the inventive method.

BRIEF DESCRIPTION OF THE DRAWINGS

Further details and advantages of the invention will be explained in more detail with the aid of the single FIGURE, wherein: the FIGURE is a flowchart for an exemplary embodiment of the inventive method.

DETAILED DESCRIPTION OF INVENTION

Shown in the FIGURE is an implementation variant of the inventive method. What can therein be seen is a flowchart showing resulting statuses or actions of the overall system.

It can further be seen that at a first step S1 the overall system proceeds according to the inventive method from a normal-function status, which is to say a status in which a handset is able to use all the functions available to it.

That status will prevail in all radio-coverage areas in which there is no range of action.

It is inventively provided for a check to be carried out to determine whether a handset that employs the inventive method is approaching a range of action of said kind. That is done in the case of the exemplary embodiment shown by ascertaining at a second step S2 whether the handset is located at a radio-cell edge bordering the range of action.

Checks of said type as a rule therein form part of a mobile-radio communication system and initiate said type of interrogating for ascertaining the need to transfer connections from one base station providing a radio-coverage area to another base station providing another radio-coverage area.

The exemplary embodiment shown is therefore based on the assumption that the radius of a range of action corresponds to the radius of a radio cell, with the invention not, though, being restricted thereto.

If said check indicates that the handset is not located at the radio-cell edge, the handset will retain its normal-function status of first step S1.

If, though, the check indicates that the handset is located at the radio-cell edge, it will be requested at a third step S3 to send position information. That will as a rule be done in such a way that the current base station or the base station providing the range of action conveys a corresponding message to the handset, whereupon, if having a GPS system, the handset will for example determine its coordinates or, alternatively, for determining said coordinates request the assistance of three base stations that will ascertain the coordinates by way of triangulation and communicate them to the handset.

It would also be possible via an RFID tag detected at the relevant location by an RFID reader for the handset or its user to obtain position information for example from the RFID reader.

At a fourth step S4 a timer is inventively started whose function is to allow the handset a certain amount of time to ascertain and convey the coordinates. A check is for that purpose carried out at a fifth step S5 to determine whether the coordinates or, as the case may be, position information have/ has been received by the network. If not, a check will be carried out at a sixth step S6 to determine whether or not the timer has expired, the fifth step S5 thereafter being repeated in a loop if it has not. If the timer has expired, though, that will at a seventh step S7 in any event cause total connection barring to be applied such that within the range of action only emergency calls can be made from that handset or, alternatively, even no connections at all will be possible for it, with that approach having the advantage that even handsets not specially equipped for the inventive method will still enable inventive barring of non-authorized persons within a range of action, meaning basically that a downward compatibility of all handsets has been realized.

If, though, the timer has not expired and a message containing position information arrives during looping between the fifth step S5 and sixth step S6, then the identity of the handset or, as the case may be, of its user will be ascertained at an eighth step S8. That is required for authorization checking, which takes place at a ninth step S9.

For that purpose either the subscriber information available to the network can be used with a table that is stored in the network, or the authorized user will be given temporary use of, for example, a card that is fitted with an RFID tag and whose identity information has an enabling function.

If interrogating indicates at ninth step S9 that the person concerned is authorized, the handset can again retain its normal-function status of the first step S1 and its functions can also be used in full within the range of action. If, though, the person concerned turns out not to be authorized, connection barring will be applied which in the case of inventively embodied handsets will mean that only emergency calls can be made and no other connections will be possible while the handset is within the range of action.

The inventive method therefore provides a solution that will not only work with already existing networks and terminals but is also suitable for terminals specially equipped for barring.

Communication controlling in public buildings such as schools, prisons, and hospitals, but also churches and elsewhere where communication or a disturbance (of the peace) is to be prevented can hence be realized thereby in a simple and efficient manner.

The invention claimed is:

1. A method for operating mobile communication terminal devices in a radio network having a base station providing a first radio-coverage area, the method comprising:
    a mobile communication terminal device operating at a first function status entering the first radio coverage area;
    the base station detecting the mobile communication terminal device;
    the base station requesting position information from the mobile communication terminal device in a first message transmitted to the mobile communication terminal device, the position information identifying a location of the mobile communication terminal device;
    initiating a timer to determine whether the mobile communication terminal device has provided the requested position information to the base station within a predetermined amount of time;
    if no message from the mobile terminal providing the requested position information is received by the base station within the predetermined amount of time, the base station barring the mobile communication terminal device from connecting to the radio network;
    if the mobile communication terminal device sends a message to the base station that has the requested position information within the predetermined amount of time, the base station ascertaining an identity of the mobile communication terminal device or a user of the mobile communication terminal device to determine an authorization status for the mobile communication terminal device;
    checking the authorization status for the mobile communication device or the user of the mobile communication terminal device;
    if the mobile communication device or the user of the mobile communication terminal device is determined to be authorized, the base station allowing the mobile communication terminal device to connect to the radio network to transmit communication messages via the radio network; and
    if the mobile communication device or the user of the mobile communication terminal device is determined to not be authorized, the base station preventing the mobile communication device from connecting to the radio network.

2. The method of claim 1 wherein the base station preventing the mobile communication device from connecting to the radio network occurs such that only emergency calls are communicatable by the mobile communication terminal device.

3. The method of claim 1 wherein the mobile communication device is a mobile telephone.

4. The method of claim 1 wherein the position information is obtained by the mobile communication terminal device for transmitting to the base station for providing the requested position information via a radio frequency identification tag.

5. The method of claim 1 wherein the position information is obtained by the mobile communication terminal device for transmitting to the base station for providing the requested position information via a global positioning system or in accordance with a triangulation method.

6. The method of claim 1 wherein the position information is comprised of coordinates according to a Global Positioning System ("GPS").

7. The method of claim 1 wherein the position information is comprised of coordinates according to a triangulation principle.

8. The method of claim 1 wherein the position information is comprised of coordinates through localizing a "Radio-Frequency Identification—RFID—tag".

9. The method of claim 1 wherein the base station detects the mobile communication terminal in radio-coverage areas that border the first radio-coverage and/or overlap the first radio-coverage.

10. The method of claim 1 wherein the base station detects the mobile communication terminal in the first radio-coverage area.

11. The method of claim 1 wherein the base station detects the mobile communication terminal by detecting an RFID tag located in a near field of the mobile communication terminal.

* * * * *